(12) United States Patent
Robinson et al.

(10) Patent No.: US 9,946,088 B2
(45) Date of Patent: Apr. 17, 2018

(54) STEREOSCOPIC LIQUID CRYSTAL DISPLAY SYSTEMS

(75) Inventors: Michael G. Robinson, Boulder, CO (US); Gary D. Sharp, Boulder, CO (US)

(73) Assignee: REALD INC., Beverly Hills, CA (US)

( * ) Notice: Subject to any disclaimer, the term of this patent is extended or adjusted under 35 U.S.C. 154(b) by 23 days.

(21) Appl. No.: 13/156,318

(22) Filed: Jun. 8, 2011

(65) Prior Publication Data

US 2011/0298998 A1    Dec. 8, 2011

Related U.S. Application Data

(60) Provisional application No. 61/352,773, filed on Jun. 8, 2010.

(51) Int. Cl.
*G02B 27/22* (2018.01)
*G02B 27/26* (2006.01)
*H04N 13/04* (2006.01)

(52) U.S. Cl.
CPC ........... *G02B 27/225* (2013.01); *G02B 27/26* (2013.01); *H04N 13/0434* (2013.01)

(58) Field of Classification Search
None
See application file for complete search history.

(56) References Cited

U.S. PATENT DOCUMENTS 4,772,943 A * 9/1988 Nakagawa et al. ............. 348/57
6,608,652 B1 * 8/2003 Yamazaki ............. G09G 3/001
                                                            348/750
6,999,155 B2 * 2/2006 Tillin .................. G02B 27/286
                                                    348/E13.03
7,195,356 B1 * 3/2007 Sharp ............................. 353/20
2003/0090597 A1 * 5/2003 Katoh et al. .................. 348/744
2003/0095092 A1 * 5/2003 Kume .................. G02F 1/13471
                                                      345/87

(Continued)

FOREIGN PATENT DOCUMENTS

JP      03-039926    *   2/1991   ............ G02B 27/18
JP      10-161096    *   6/1998   ........... G02F 1/1335

OTHER PUBLICATIONS

Jung et al., "A Novel Polarizer Glasses-Type 3D Displays with an Active Retarder," SID Symposium Digest of Technical Papers, col. 40, Issue 1, p. 348-351 (Jun. 2009).

(Continued)

*Primary Examiner* — Edward Glick
*Assistant Examiner* — Anthony G Quash
(74) *Attorney, Agent, or Firm* — Penny L. Lowry; Neil G. Mothew

(57) ABSTRACT

Stereoscopic display system assemblies may be configured to have optimal performance with passive, circular analyzing, cinema eyewear. They may comprise non-twisted electrically controlled birefringent liquid crystal modulators oriented at ±45° to the polarizer orientation of the eyewear. Exemplary embodiments may include single half-wave modulators with a crossing (i.e. negating) quarter wave films. The natural polarization state of the LCD may be rotated and cleaned-up when necessary to cross with the horizontal eyewear polarizer orientation. In an embodiment, the LC modulator substrate is positioned outermost for anti-reflection coating tolerance, durability and touch sensitivity.

20 Claims, 3 Drawing Sheets

(56) References Cited

U.S. PATENT DOCUMENTS

| | | | |
|---|---|---|---|
| 2003/0128321 A1* | 7/2003 | Nakanishi | 349/117 |
| 2004/0212767 A1* | 10/2004 | Sasaki et al. | 349/118 |
| 2005/0111073 A1* | 5/2005 | Pan et al. | 359/280 |
| 2005/0168815 A1* | 8/2005 | Maruyama et al. | 359/465 |
| 2006/0227256 A1* | 10/2006 | Hamagishi | G02B 27/2214 349/15 |
| 2006/0268185 A1* | 11/2006 | Hamagishi et al. | 349/15 |
| 2007/0013818 A1* | 1/2007 | Trapani et al. | 349/1 |
| 2007/0188863 A1 | 8/2007 | Sun et al. | |
| 2008/0266470 A1* | 10/2008 | Muramoto | G02B 5/3083 349/8 |
| 2008/0297897 A1 | 12/2008 | Oyamada et al. | |
| 2008/0316303 A1 | 12/2008 | Chiu | |
| 2009/0103178 A1* | 4/2009 | Woodgate et al. | 359/465 |
| 2009/0142865 A1* | 6/2009 | Sawatari et al. | 438/30 |
| 2009/0147075 A1* | 6/2009 | Plant | 348/54 |
| 2009/0147160 A1* | 6/2009 | Roosendaal | G02B 27/2214 349/15 |
| 2009/0189976 A1 | 7/2009 | Morozov | |
| 2009/0190213 A1* | 7/2009 | Tamura et al. | 359/465 |
| 2010/0157032 A1* | 6/2010 | Park et al. | 348/57 |
| 2011/0032345 A1* | 2/2011 | Robinson et al. | 348/58 |
| 2011/0205495 A1* | 8/2011 | Coleman | G02B 27/26 353/8 |
| 2011/0241978 A1* | 10/2011 | Fergason | 345/89 |

OTHER PUBLICATIONS

Robinson et al., "Polarization Engineering for LCD Projection", John Wiley & Sons Ltd. (2005).

"Late-News Paper: A Novel Polarizer Glasses-Type 3D Displays with an Active Retarder," pp. 348-351, vol. 40, Issue 1, SID Symposium Digest of Technical Papers (Jun. 2009).

Robinson et al. "Polarization Engineering for LCD Projection," Wiley & Sons (2005).

Notification of Transmittal of the International Search Report and the Written Opinion of the International Searching Authority and the International Search Report and Written Opinion of the International Searching Authority dated Feb. 23, 2012.

* cited by examiner

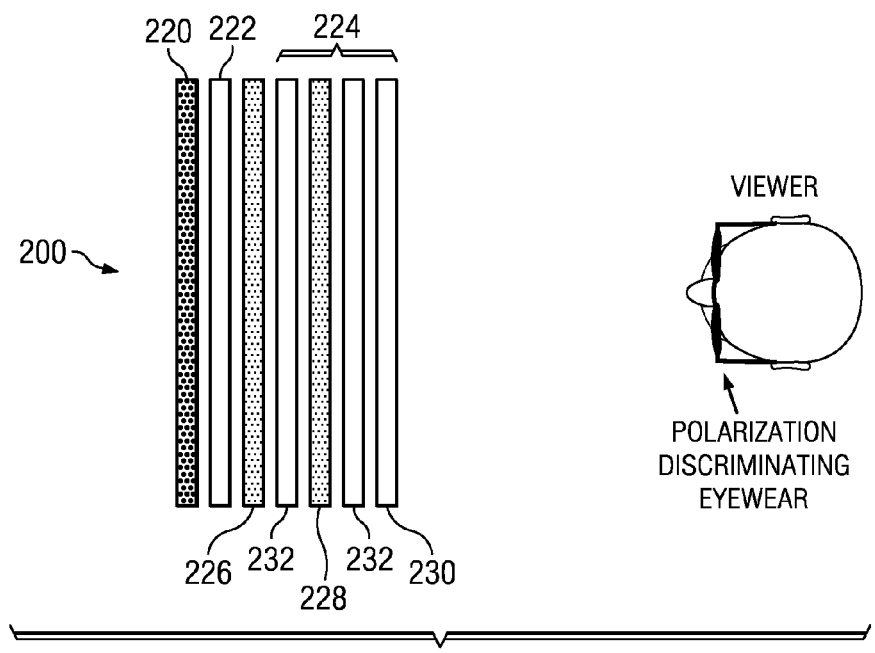
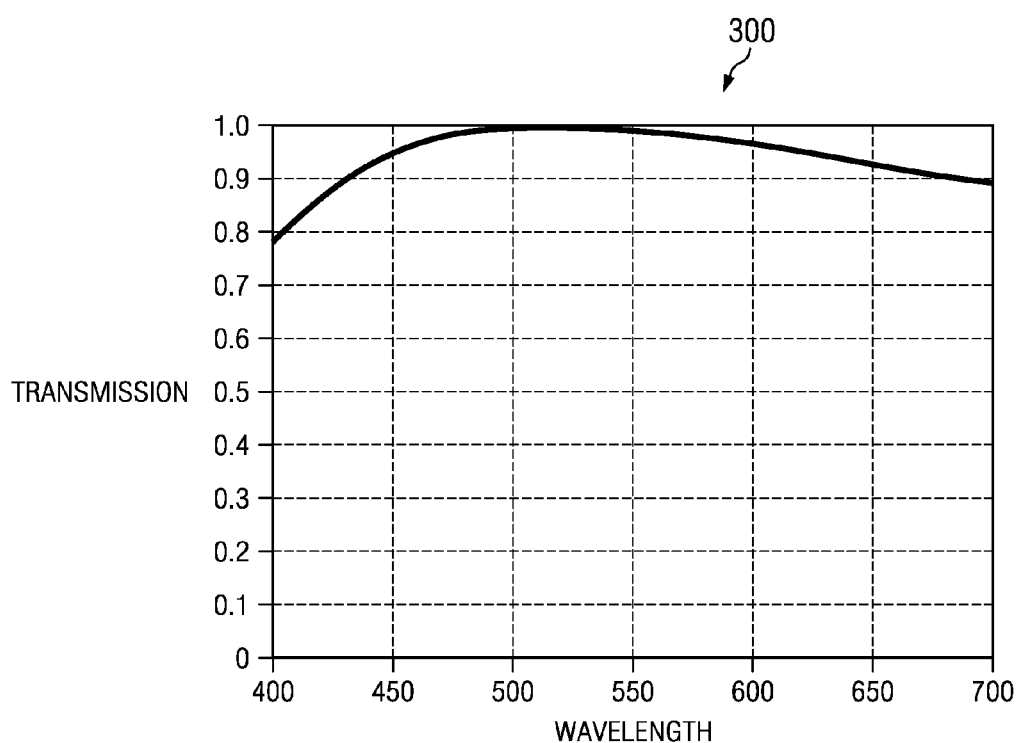

STEREOSCOPIC LIQUID CRYSTAL DISPLAY SYSTEMS

CROSS REFERENCE TO RELATED APPLICATIONS

This application relates and claims priority to commonly-assigned U.S. Provisional Patent Application No. 61/352,773, filed Jun. 8, 2011, and entitled "Stereoscopic liquid crystal display systems" which is incorporated herein by reference for all purposes.

TECHNICAL FIELD

This disclosure generally relates to stereoscopic liquid crystal display (LCD) systems and, more particularly, relates to system assemblies that are compatible with suitable eyewear.

BACKGROUND

Stereoscopic, or stereo, 3-D displays enhance the perception of images presented on a 2-D screen by presenting different images to each eye of the viewer. The viewer's visual system fuses these disparate images in such a way as to create a sensation of depth. To create 3-D effects, conventional approaches have used eyewear to determine which image data goes to the left or right eye. One conventional 3-D system is the RealD cinema system that uses passive circularly polarized glasses to separate time-sequentially projected circularly-polarized images.

SUMMARY

In an exemplary embodiment of a flat panel display operable to display stereoscopic imagery, a top and a bottom of the display are defined by a viewer frame of reference. A vertical is defined by a line extending from the top to the bottom of the display, and the vertical is perpendicular to a top edge and a bottom edge of the display. In an embodiment, the exemplary display may include a liquid crystal display (LCD) panel operable to provide left- and right-eye image encoded light, wherein the light has a polarization axis that is not parallel to the vertical. The exemplary display may also include a polarization rotation element positioned to receive the left- and right-eye image encoded light incident from the LCD panel and operable to rotate the polarization axis of the incident light to a substantially vertical orientation. The exemplary display may further include a polarization modulation element positioned to receive the light incident from the polarization rotation element and operable to selectively transform the state of polarization (SOP) of the received light in synchronization with the left- and right-eye image encoded light provided by the LCD panel.

In another exemplary embodiment of a flat panel display operable to display stereoscopic imagery, a top and a bottom of the display are defined by a viewer frame of reference. A vertical is defined by a line extending from the top to the bottom of the display, and the vertical is perpendicular to a top edge and a bottom edge of the display. In an embodiment, the exemplary display may include a liquid crystal display (LCD) panel operable to provide left- and right-eye image encoded light, wherein a polarization axis of the encoded light is oriented at +45° or −45° with respect to the vertical. The exemplary display may also include a polarization rotation element positioned to receive the left- and right-eye image encoded light incident from the LCD panel and operable to rotate the polarization axis of the incident light to a substantially vertical orientation. The exemplary display may further include a polarization modulation element positioned to receive the light incident from the polarization rotation element and operable to selectively transform the state of polarization (SOP) of the received light in synchronization with the left- and right-eye image encoded light provided by the LCD panel.

In another exemplary embodiment of a method of providing stereoscopic imagery with a liquid crystal display (LCD), a top and a bottom of the display are defined by a viewer frame of reference. A vertical is defined by a line extending from the top to the bottom of the display, and the vertical is perpendicular to a top edge and a bottom edge of the display. In an embodiment, the method may include providing, from a liquid crystal display (LCD) panel, left- and right-eye image encoded light, wherein the light has a polarization axis that is not parallel to the vertical. The exemplary method may further include receiving, at a polarization rotation element, the left- and right-eye image encoded light incident from the LCD panel, and rotating, with the polarization rotation element, the polarization axis of the incident light to a substantially vertical orientation. The exemplary method may also include receiving, at a polarization modulation element, light incident from the polarization rotation element, and selectively transforming, with the polarization modulating element, the state of polarization (SOP) of the received light in synchronization with the left- and right-eye image encoded light provided by the LCD panel.

BRIEF DESCRIPTION OF THE DRAWINGS

FIG. 2B is a schematic diagram of the exploded side view of the LCD system shown in FIG. 2A;

FIG. 3 is a graph of polarization integrity of a single film 45 degree polarization transformation, in accordance with the present disclosure;

DETAILED DESCRIPTION

Figure 1:
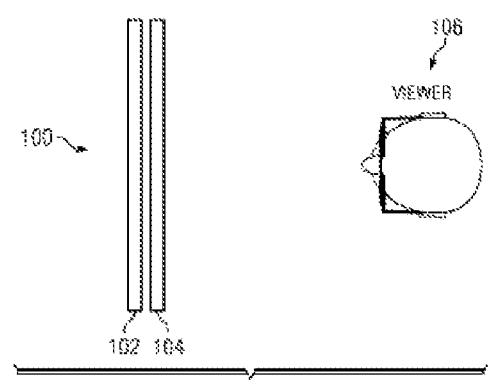
FIG. 1 is a schematic diagram of the top view of a conventional LCD display system.

FIG. 1 is a schematic diagram illustrating a conventional stereoscopic liquid crystal display system 100 comprising a liquid crystal display (LCD) 102 located proximate to a polarization control panel (PCP) 104. The LCD 102 may alternate left- and right-eye images that are selectively polarized with the liquid crystal PCP 104. Passive polarizing eyewear 106 worn by a viewer then blocks light from incorrect eye images.

This approach is similar in concept to a 3D cinema system, but the projector in a 3D cinema system is replaced by an LCD. However, LCDs are typically slow to update and are addressed line by line in a continuous scroll. It is thus difficult to view or polarize correctly an entire settled frame in isolation without modifying certain aspects of this conventional approach. U.S. Pat. Pub. No. 2008/0316303, which is herein incorporated by reference, is directed to providing a scrolling segmented polarization control panel with optional alternate panel addressing and temporal and spatial control of the back light illumination.

One aspect of the present disclosure is directed to display system that may be compatible with circularly polarized, passive cinema eyewear whose lenses may comprise a single, orthogonally oriented quarter wave retarder films coupled to a neutral horizontal polarizer. This prescription may be used to analyze particular stereoscopic polarization states from a compatible display for optimal performance. Such stereoscopic polarization states may be encoded, in an embodiment, by first launching linear, vertically polarized light into modulating retardation elements oriented orthogonally, such as at ±45°. This may be distinguishable from using the twisted nematic liquid crystal modulators cited in *A Novel Polarizer Glasses-Type 3D Displays with an Active Retarder*, p. 348•SID 09 DIGEST as part of the polarization control panel element. Twisted liquid crystal modulators provide complex output polarization states that are only approximately analyzed by untwisted components. For viewing angle purposes, twisted nematic LCD panels have output linear polarization oriented at ±45° to the vertical. Altering this orientation to a vertical orientation to match the eyewear may be achieved using one or more retarder films. In some embodiments, such an approach provides insufficient polarization fidelity. Thus, a vertical, highly transmitting, 'clean-up' polarizer may be used prior to the polarization control panel.

Figure 2A:
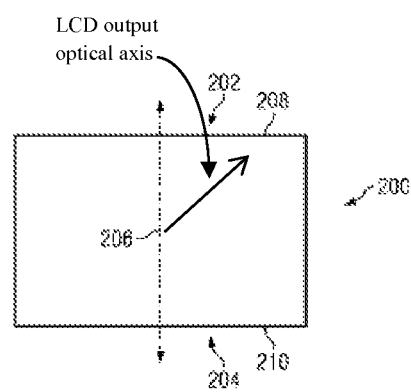
FIG. 2A is a schematic diagram of the frontal view of a general cinema-eyewear-compatible, time-sequential stereoscopic LCD system, in accordance with the present disclosure.

As discussed above, one aspect of this disclosure is directed to rotating the polarization axis of the light provided by an LCD panel to match the cinema eyewear. FIG. 2A illustrates a frontal view of an exemplary display 200. The display 200 is operable to display stereoscopic imagery, and a top 202 and a bottom 204 of the display 200 are defined by a viewer frame of reference. A vertical orientation is defined by a line 206 extending from the top 202 to the bottom 204 of the display 200, and is perpendicular to a top edge 208 and a bottom edge 210 of the display 200. Orientation angles are defined from the vertical when looking toward the display. As used herein, clockwise rotation is a positive angle, and counterclockwise rotation is described as a negative angle from the vertical.

FIG. 2B is an exploded side view of the display 200 shown in FIG. 2A. As shown in FIG. 2B, the display 200 may include a liquid crystal display (LCD) panel 220 operable to provide left- and right-eye image encoded light. In an exemplary embodiment, the LCD panel 220 may be a twisted nematic liquid crystal display (TNLCD) panel that is operable to provide light having a polarization axis that is not parallel to the vertical. In some embodiment, the light provided by the LCD panel 220 has a polarization axis oriented at +45° or −45° with respect to the vertical.

The display 200 may further include a polarization rotation element 222 positioned to receive the left- and right-eye image encoded light incident from the LCD panel 220 and operable to rotate the polarization axis of the incident light to a substantially vertical orientation. The display 200 may also include a polarization control panel element 224 positioned to receive the light incident from the polarization rotation element 222 and operable to selectively transform the state of polarization (SOP) of the received light in synchronization with the left- and right-eye image encoded light provided by the LCD panel 220.

As discussed above, the LCD panel 220 may comprise a low cost twisted nematic liquid crystal display (TNLCD), such as those used in most laptop computers and desktop monitors. Here, the polarization axis of the light exiting the TNLCD panel 220 may be oriented at −45° with respect to the vertical. An exemplary polarization rotation may be accomplished using polarization rotation element 222 that includes a single half wave retarder ($\Gamma=\Delta n$. $d\approx260$ nm@$\lambda=520$ nm) oriented at $\approx-22.5°$. In such an embodiment, this single film may not completely correctly transform polarization for all visible wavelengths outside of the design wavelength of 520 nm, and a vertically oriented 'clean-up' polarizer 226 may therefore be used to filter out unwanted light having a polarization axis that is not parallel to the vertical and transmit light only along the vertical orientation. In an embodiment, a polarizer 226 having a vertical polarization axis may be positioned between the polarization rotation element 222 and the polarization modulation element 224.

It is to be appreciated that the polarization rotation element 222 may be configured in a variety of ways to rotate the polarization axis of the incident light to a vertical orientation. The retarder(s) used in the polarization rotation element 222 may be a negative dispersion compensation film in some embodiments. As discussed above, the polarization rotation element 222 may include a single half wave retarder oriented at approximately −22.5°. In another exemplary embodiment, polarization rotation element 222 may comprise a stack of two or more half wave retarders. In an embodiment, polarization rotation element 222 may comprise a stack having a first half wave retarder oriented at −32.5° and a second half wave retarder oriented at −10.5°. In another embodiment, polarization rotation element 222 may comprise a stack having a first half wave retarder oriented at −38.3°, a second half wave retarder oriented at −21.6°, and a third half wave retarder oriented at −5.7°. In some embodiments, the polarization rotation element 222 may include a biaxially stretched retarder film. It should be appreciated that other embodiments that perform the function of rotating the light from the LCD panel to the oplarizatio nmodulation element 224 may have different combinations of retardances, orientations, and number of layers. Design considerations to make such retarder stacks may be found in the commonly-authored book, Robinson et al., *Polarization Engineering for LCD Projection* (Wiley 2005), herein incorporated by reference.

FIG. 3 is a graph 300 illustrating a normalized transmission profile for the single half wave film embodiment described above. Graph 300 shows the polarization integrity of the 45 degree light transformation for a range in the visible spectrum through polarization rotation element 222. As may be seen, the transmission is at a maximum around the design wavelength of 520 nm, but as wavelengths increase and decrease from this design wavelength, less light is transmitted The spectral transmission through an ideal neutral polarizer is then a measure of the polarization integrity of the transformation and is shown for this cost effective single polycarbonate film approach in FIG. 3.

Referring back to FIG. 2, the polarization control panel 224 may be positioned to receive the encoded light either directly or indirectly from the LCD panel 220. In an embodiment, the polarization control panel 224 is operable to receive and modulate vertically polarized light provided by the polarization rotation element 222. The polarization control panel 224 is operable to selectively transform the state of polarization (SOP) of the received light to substantially circularly polarized light in synchronization with the left- and right-eye image encoded light provided by the LCD panel 220. The polarization control panel 224 may include an LC modulation element 228 and a retardation element 230, which in cooperation, may be operable to transform the SOP of the received light to circularly polarized light. In an embodiment, the LC modulation element 228 comprises a zero-twist liquid crystal modulating cell operable to switch between first and second states, the cell having first and second retardations when the cell is in the first and second states, respectively. The modulating cell may be a fast electrically controlled birefringent (ECB) mode (anti-parallel aligned), or a pi-cell mode (parallel aligned). In an exemplary embodiment, complexity and cost reduction may favor the use of a single half-wave (HW) modulating cell, such as a pi-cell for switching speed purposes. In an embodiment, the orientation of the LC modulation element 228 may be set at +45°, which in some instances, directs the lowest cross-talk, best viewing angle image at the right eye.

To provide circularly polarized light, the polarization axes of the LC modulation element 228 and the retardation element 230 may be aligned at substantially orthogonal orientations, and the LC modulation element 228 and the retardation element 230 may be configured to provide a net retardation substantially equal to a quarter wave. In an embodiment, the LC modulation element 228 comprises a zero to half-wave pi cell, and the retardation element 230 comprises a quarter wave retarder film. Configured as such, the polarization control panel 224 has a net retardation of approximately a quarter wave, and switching the cell of the LC modulation element 229 between the first and second states provides encoded light having first and second circular polarizations, respectively. It is to be appreciated that the embodiments provided herein are merely exemplary, and a variety of combinations of the LC modulation element 228 and the retardation element 230 may be used to provide a net retardation of approximately a quarter wave. For example, starting with the exemplary embodiment discussed above, a retardation value of δ may be added to both LC modulation element 228 and the retardation element 230 while still maintaining a net retardation of approximately a quarter wave. However, it is to be appreciated that the quality of the field of view may be optimized by minimizing δ.

It is to be further appreciated that a variety of alignments of the LC modulation element 228 and the retardation element 230 may be used. In an embodiment, the LC modulation element 228 may be aligned at substantially +45° or −45°, and the retardation element 230 may be aligned at an orthogonal orientation relative to the LC modulation element 228. For example, the LC modulation element 228 may be aligned at +45° and the retardation element 230 may be aligned at −45°. While the alignment of the LC modulation element 228 and the retardation element 230 may deviate from +45° or −45°, it is to be appreciated that the amount of deviation is inversely proportional to the quality of the 3D perception by the viewer.

In an embodiment, wide angle compensation films 232 may be attached to the polarization control panel 224 to improve polarization fidelity at non-normal viewing angles. In the case of pi-cells, as shown in the illustrated embodiment, the compensation may be provided by two matching films 232 placed on either side of the cell 228. The matching films may be made of continuously bent, negative birefringent materials such as polymerized discotic liquid crystal materials. Matching the bend profile to that of the pi-mode liquid crystal in its half switched (quarter wave) state provides one solution for wide angle fidelity. Such films exist and are commercialized by Fuji film. An alternative solution uses more widely available vertically aligned negative birefringent films. In low cost systems where the LCDs themselves compromise wide angle viewing, compensation films may be removed altogether. In an exemplary embodiment, the wide angle compensation films 232 may include a biaxially stretched film, which allows for manipulation of the out of plane birefringence.

As discussed above, the polarization control panel 224 may include a retardation element 230 crossed with the half-wave electrically controlled birefringent (ECB) modulator (i.e. oriented at −45°). In an embodiment, the retardation element 230 may be a quarter-wave (QW) retarder film for providing output circular polarization used by the eyewear. In an embodiment, its retardance is close to that of the eyewear ($\approx 125$ nm) plus the high voltage residual retardance of the LC cell ($\approx 20$ nm). In an exemplary embodiment, the retardation element 230 may include a biaxially stretched quarter wave film, which allows for manipulation of the out of plane birefringence. For optimal off-axis viewing performance, it is desirable to use a biaxial retarder film for the QW retarder, where $R_{th}$ is around 300 nm, where $$R_{th} = \left(\frac{(nx+ny)}{2} - nz\right)d$$

and is a figure commonly supplied by substrate manufacturers in the display industry. nx, ny, and nz are the refractive indices of the stretched film in the orthogonal x, y, and z directions, and d is the film thickness.

The order of the various components that make up the polarization control panel 224 is flexible. The compensation films are typically adjacent the LC cell but the order of the films in relation to the viewer may vary. In some embodiments, rigorous simulation of the optical output under the assumption of good index matching bonds and low front surface reflection slightly favor having the retardation element 230 being closest to the viewer.

Figure 4:
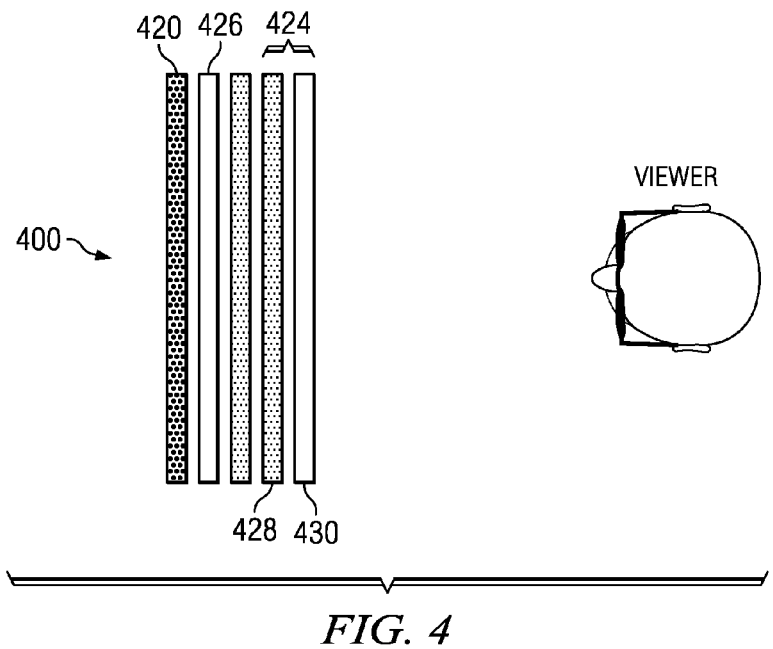
FIG. 4 is a schematic diagram of a cost efficient embodiment, in accordance with the present disclosure.

FIG. 4 is a schematic diagram of an embodiment of a display 400 having a twisted nematic (TN) laptop-like panel 420. One thing to note about the embodiment of FIG. 4 is its exposure of the front surface retarder element 430, which is typically a polymeric film to possible environmental degradation and mechanical abuse. Humidity may attack polymeric films resulting in swelling and delamination. Additionally, such polymeric films are easily physically damaged through touching. For practical purposes, it is therefore be desirable to encapsulate all polymer films by the glass making up the LC modulating element 428 of the polarization control panel 424.

Figure 5:
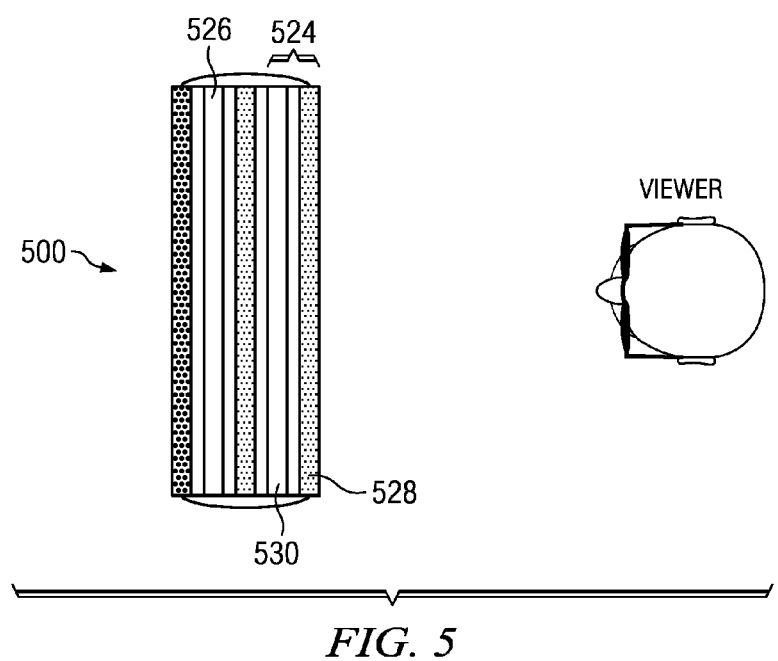
FIG. 5 is a schematic diagram of a second durable embodiment, in accordance with the present disclosure.

FIG. 5 is a schematic diagram illustrating an embodiment including a modification to the embodiment of FIG. 4. The display 500 of FIG. 5 includes a polarization control panel 524 that has an LC modulation element 528 following the retardation element 530 in the light path; such an embodiment is more durable. To further protect the retardation element 530, edge portions of the display 500 may be separated from the environment by a hermetic seal. Another possible advantage to the system in FIG. 5 is the improved (i.e. lower) cross-talk performance when the front surface has significant back reflections. This is the case when either low cost or no anti-reflection (AR) coating is applied to the external surface of an assembled display. Reflections that enable light to pass through the quarter wave (QW) layer and back reduce contrast and increase stereoscopic crosstalk. Analyzing eyewear may leak this reflected light into the wrong eye as it is orthogonal to the desired state. The most reflective surfaces of the embodiments of FIG. 4 and FIG. 5 may be the internal indium tin oxide (ITO) surfaces of the LC modulator and the external surface. Reflections from the LCD may be re-polarized correctly by the 'clean up' polarizer 426, 526 and do not cause leakage while other surface reflections are negligible from index matched bonding. A practically desirable feature shown in the embodiment of FIG. 5 is that it has both highly reflecting surfaces one side of the retardation element 530.

Another advantage of placing the LC modulation element 528 outermost and facing the viewer is to potentially detect touch through cell deformation. Striping the LC conducting substrates' indium tin oxide (ITO) orthogonally could allow for accurate positional touch sensing often used by modern computer interfacing. Striped indium tin oxide (ITO) may be used for a scrolling stereoscopic display operation (see e.g., U.S. Pat. Pub. No. 2008/0316303, which is herein incorporated by reference). Touch and stereoscopic display capability with a single modulating element may be attractive.

This underlying concept of placing the LC modulation element 528 on the outside of the LCD polarization control panel assembly for durability and performance reasons can also apply to other related stereoscopic display systems. These might include those using TV LCD panels, whose vertical output polarization minimizes or substantially eliminates the need for rotation and clean-up films. Other systems might utilize alternative quarter-wave analyzing eyewear having 45° rotated cinema circularly polarized lenses that match the native output polarization of twisted nematic LCDs. In such embodiments, the polarization control panel 524 may include a single quarter wave (QW) film 530 and electrically controlled birefringent (ECB) LC modulation element 528 oriented at 0° (i.e. vertical) and 90° respectively.

Related embodiments to those above may include those with extra films for improved polarization control especially in off-normal directions.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A flat panel display operable to display stereoscopic imagery, comprising:
   a vertical which is defined by a line extending from the top to the bottom of the display, wherein a top and a bottom of the display are defined by a viewer frame of reference, and farther wherein the vertical is perpendicular to a top edge and a bottom edge of the display,
   a liquid crystal display (LCD) panel that provides left- and right-eye image encoded light, wherein the LCD panel outputs light with a polarization axis oriented non-orthogonally to the vertical;
   a polarization rotation element positioned to receive the left- and right-eye image encoded light incident from the LCD panel and that rotates the polarization axis of the incident light to a vertical orientation; and
   a polarization modulation element positioned to receive the light incident from the polarization rotation element and that selectively transforms the state of polarization (SOP) of the received light in synchronization with the left- and right-eye image encoded light provided by the LCD panel, wherein the polarization modulation element is aligned at substantially +45° or −45° with respect to the vertical, further wherein the left-eye image encoded light has a first polarization and the right-eye image encoded light has a second polarization.

2. The display of claim 1, further comprising a polarizer having a vertical polarization axis, the polarizer positioned between the polarization rotation element and the polarization modulation element and that filters out light having a polarization axis that is not parallel to the vertical.

3. The display of claim 1, wherein the polarization axis of the light provided by the LCD panel is aligned at −45° with respect to the vertical, and wherein the polarization rotation element comprises a half wave retarder oriented at −22.5°.

4. The display of claim 3, further comprising a polarizer having a vertical polarization axis, the polarizer positioned between the polarization rotation element and the polarization modulation element and that filters out light having a polarization axis that is not parallel to the vertical.

5. The display of claim 1, wherein the polarization rotation element comprises a negative dispersion compensation film.

6. The display of claim 1, wherein the polarization rotation element comprises a stack of two or more half wave retarders.

7. The display of claim 6, wherein the stack of two or more half wave retarders comprises:
   a first half wave retarder oriented at −32.5°; and
   a second half wave retarder oriented at −10.5°.

8. The display of claim 6, wherein the stack of two or more half wave retarders comprises:
   a first half wave retarder oriented at −38.3°;
   a second half wave retarder oriented at −21.6°; and
   a third half wave retarder oriented at −5.7°.

9. The display of claim 6, wherein the stack of two or more half wave retarders comprises biaxially stretched films.

10. A flat panel display operable to display stereoscopic imagery, comprising:
    wherein a top and a bottom of the display are defined by a viewer frame of reference, and wherein a vertical is defined by a line extending from the top to the bottom of the display, and wherein the vertical is perpendicular to a top edge and a bottom edge of the display,
a liquid crystal display (LCD) panel that provides left- and right-eye image encoded light, wherein a polarization axis of the encoded light is oriented at +45° or −45° with respect to the vertical;
a polarization rotation element positioned to receive, the left- and right-eye image encoded light incident from the LCD panel and that rotates the polarization axis of the incident light to a vertical orientation; and
a polarization modulation element positioned to receive the light incident from the polarization rotation element and that selectively transforms the state of polarization (SOP) of the received light in synchronization with the left- and right-eye image encoded light provided by the LCD panel, wherein the polarization modulation element is aligned at substantially +45° or −45° with respect to the vertical, further wherein the left-eye image encoded light has a first polarization and the right-eye image encoded light has a second polarization.

11. The display of claim 10, further comprising a polarizer having a vertical polarization axis, the polarizer positioned between the polarization rotation element and the polarization modulation element and that filters out light having a polarization axis that is not parallel to the vertical.

12. The display of claim 10, wherein the polarization rotation element comprises a stack of two or more half wave retarders.

13. The display of claim 12, wherein the stack of two or more half wave retarders comprises:
a first half wave retarder oriented at −32.5°; and
a second half wave retarder oriented at −10.5°.

14. The display of claim 12, wherein the stack of two or more half wave retarders comprises:
a first half wave retarder oriented at −38.3°;
a second half wave retarder oriented at −21.6°; and
a third half wave retarder oriented at −5.7°.

15. A method of providing stereoscopic imagery with a liquid crystal display (LCD), wherein a top and a bottom of the display are defined by a viewer frame of reference, and wherein a vertical is defined by a line extending from the top to the bottom of the display, and wherein the vertical is perpendicular to a top edge and a bottom edge of the display, the method comprising:

providing, from a liquid crystal display (LCD) panel, left- and right-eye image encoded light, wherein the LCD panel outputs light with a polarization axis oriented non-orthogonally to the vertical;
receiving, at a polarization rotation element, the left- and right-eye image encoded light incident from the LCD panel;
rotating, with the polarization rotation element, the polarization axis of the incident light to a vertical orientation;
receiving, at a polarization modulation element, light incident from the polarization rotation element; and
selectively transforming, with the polarization modulating element, the state of polarization (SOP) of the received light in synchronization with the left- and right-eye image encoded light provided by the LCD panel, wherein the polarization modulation element is aligned at substantially +45° or −45° with respect to the vertical further wherein the left-eye image encoded light has a first polarization and the right-eye image encoded light has a second polarization.

16. The method of claim 15, wherein providing encoded light from the LCD panel comprises providing encoded light having a polarization axis oriented at +45' or −45° with respect to the vertical.

17. The method of claim 15, further comprising:
providing a polarizer having a vertical polarization axis, the polarizer positioned between the polarization rotation element and the polarization modulation element; and filtering out light having a polarization axis that is not parallel to the vertical.

18. The method of claim 15, wherein the polarization rotation element comprises a stack of two or more half wave retarders.

19. The method of claim 18, wherein the stack of two or more half wave retarders comprises biaxially stretched films.

20. The method of claim 15, wherein the polarization axis of the light provided by the LCD panel is aligned at −45° with respect to the vertical, and wherein the polarization rotation element comprises a half wave retarder oriented at −22.5°.

* * * * *